United States Patent [19]

Smith

[11] Patent Number: 5,086,023

[45] Date of Patent: Feb. 4, 1992

[54] CATALYST FOR EPDM POLYMERIZATION

[75] Inventor: Gregory M. Smith, Danbury, Conn.

[73] Assignee: Akzo N.V., Arnhem, Netherlands

[21] Appl. No.: 714,399

[22] Filed: Jun. 13, 1991

[51] Int. Cl.$^5$ ................................................ C08F 4/68
[52] U.S. Cl. ..................................... 502/103; 502/123
[58] Field of Search ............................... 502/103, 123

[56] References Cited

PUBLICATIONS

Maatta, E. A., *Inorg. Chem.*(1984), 23, 2560-2561.

Primary Examiner—Patrick P. Garvin
Assistant Examiner—Brent M. Peebles
Attorney, Agent, or Firm—Richard P. Fennelly; Louis A. Morris

[57] ABSTRACT

EPDM polymers can be polymerized using a catalyst containing a Group I to Group III organometallic compound (e.g., a dialkylaluminum halide) and a vanadium imido complex (e.g., $Cl_3V=N-R$, where R is alkyl, aryl, or alkyl-substituted aryl).

10 Claims, No Drawings

CATALYST FOR EPDM POLYMERIZATION

BACKGROUND OF THE INVENTION

This invention relates to the problem of preparing random terpolymers of ethylene, propylene and a diene, such as ethylidenenorbornene (ENB), dicyclopentadiene (DCPD), or 1,4-hexadiene (HD). These terpolymers are known as EPDM and can be fabricated and cured like many other natural and synthetic rubbers.

In commercial practice, EPDM is prepared in a Ziegler-Natta polymerization process that uses a catalyst system which comprises a Group IV-Group VII transition metal compound, e.g., a vanadium compound, as one component of the catalyst and a Group I-III organometallic compound, e.g., an alkylaluminum halide, as the other component of the catalyst. (See, for example, The Encyclopedia of Polymer Science and Engineering, Vol. 6 (1986) at pp. 545-546 and U.S. Pat. No. 4,347,159). Vanadium compounds used for this process include $VOCl_3$, $VCL_4$, $V(2,4\text{-pentanedionate})_3$, and simple derivatives of these compounds. One shortcoming of the existing systems is that they show a low activity for incorporating the diene and propylene relative to their activity for ethylene. This results in the use of excess propylene and diene in the polymerization process, which, in order to obtain the desired level of incorporation, must be recycled. Eliminating or reducing this need for recycling excess diene would be useful.

DESCRIPTION OF THE INVENTION

To achieve the desired reduction in the need for recycling excess diene, the environment around the vanadium center, for example, must be changed so that it incorporates diene into the growing polymer chain more readily. One way to do this, in accordance with the present invention, would be to replace the oxo group in vanadium oxyhalides, such as $VOCl_3$, for example, with another group that has different electronic characteristics. The imido group ($=N-R$) meets these requirements, and several vanadium imido complexes are known in the chemical literature. The present invention, in its broadest embodiments uses a vanadium imido complex of the following general formula

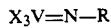
$X_3V=N-R$ where X is a group capable of forming a single bond to vanadium and R is a suitable hydrocarbyl substituent. The atom in X which bonds to vanadium can be a Group VA atom, such as nitrogen or phosphorus, a Group VIA atom, such as oxygen or sulfur, or a Group VIIA atom, such as chlorine, bromine or fluorine. Representative groups or atoms that may be selected for use as X include the halogens, and such hydrocarbyl (R) containing groups as $-OR$, $-NR_2$, $-SR$, and $-PR_2$. The group R (either attached to the nitrogen atom or in the X groups mentioned above) is hydrocarbyl such as alkyl, aryl, or alkyl-substituted aryl. The vanadium imido complexes which are preferred for use herein are those which have chlorine as the halogen atom and have the following formula:

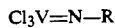
$Cl_3V=N-R$ (1)

R=Alkyl, Aryl, or Alkyaryl

Some relevant disclosures for vanadium imido complexes which exist are: J. Am. Chem. Soc., 1987, 190:7408-7416; Inorg. Chem. 1984, 23:2560-2561; Organomet. 1990, 9, 2207-2209; and Z. Naturforsch. 1986, 41B, 185 and 1987, 42B, 881. However, no reports of the use of these complexes in EPDM polymerization processes are believed to have appeared.

This invention employs such vanadium imido complexes as the vanadium containing component in a novel process for the preparation of EPDM.

In general, the catalyst composition of the present invention is analogous to known catalysts containing a vanadium oxyhalide component, e.g., $VOCl_3$, and a suitable Group I-III organometallic cocatalyst compound, such as a dialkylaluminum halide (e.g., diethylaluminum chloride, isobutylaluminum chloride, and the like), a trialkylaluminum (e.g., triethylaluminum), a dialkylzinc (e.g., diethylzinc), or a dialkylmagnesium (e.g., diethylmagnesium). The novelty is the use of the aforementioned vanadium imido complexes where R can, for example, be alkyl, aryl, or alkyl-substituted aryl, for example, $C_1$-$C_{20}$ alkyl, $C_6$-$C_{20}$ aryl, and $C_1$-$C_{20}$ alkyl-substituted aryl. The length of the alkyl chain, if present either as such or as an alkyl substituent on an aryl ring, is not deemed especially critical to the performance of the catalyst. The halogen moieties in the vanadium imido complex are preferably chloro but bromo substituents could be substituted.

The relative molar ratio of metal in the organoaluminum component to vanadium in the complex can range from about 1:1 to about 200:1. The catalyst can be utilized in 15 polymerization of ethylene, propylene and diene monomers using conventionally employed conditions (e.g., pressures of from about 0.1 bar to about 100 bars, preferably 1-10 bars and temperatures of from about $-20°$ C. to about $100°$ C., preferably from $0°$ C. to about $60°$ C.).

The present invention is illustrated by the Examples which follow.

EXAMPLES 1-4

$Cl_3V=N(C_6H_4-p-CH_3)$ was prepared according to the literature method. (See J. Am. Chem. Soc. 1987, 109, 7408-7416). Aluminum compounds were obtained from Texas Alkyls Inc. Standard air free manipulation techniques were employed for all steps involving air sensitive materials. All polymerizations were conducted in a one liter ZIPPERCLAVE reactor from autoclave engineers. All solvents, monomers and reagents were pre-dried and deoxygenated.

The reactor was charged with 500 mL hexane, 2.0 mL ethylidenenorbornene (ENB), and the desired amount of alkylaluminum halide cocatalyst as described below. Temperature control was established at $25°$ C., and the pressure in the reactor was allowed to equilibrate with atmospheric. The reactor was then pressurized to 2.0 psig with hydrogen. Propylene was admitted to the reactor until the total pressure reached 25 psig, and the reactor was finally pressurized to 50 psig with an equimolar mixture of ethylene and propylene. A pre-measured amount of the catalysts was then added to the reactor under pressure to begin polymerization. During polymerization, the temperature was allowed to rise to $30°$ C., and control was re-established. The pressure in the reactor was maintained at 50 psig by supplying an equimolar mixture of ethylene and propylene on demand.

After the polymerization had proceeded for 30 min, the reactor contents were removed through a dip tube and collected in a jar containing 50 mL hexane and 5 mL isopropanol to kill the catalyst. The resulting polymer cement was poured into 3 liters of rapidly stirred isopropanol to precipitate the polymer product. The EPDM was then collected by decantation or filtration, dried, weighed and analyzed by standard techniques (ASTM D3900).

The results are as follows:

| Catalyst | Co-catalyst Al/V* | Yield (g/g V) | E:P Ratio | % ENB (w/w) | $M_w$ | $M_w/M_n$ × $10^3$ |
|---|---|---|---|---|---|---|
| VOCl$_3$ | EASC(20) | 1700 | 48:52 | 5.1 | 194 | 2.0 |
| CL$_3$VNR | EASC(20) | 440 | 67:33 | 11.5 | 262 | 2.4 |
| CL$_3$VNR | DEAC(20) | 540 | 65:35 | 11.1 | 82 | 1.7 |
| CL$_3$VNR | DEAC(40) | 480 | 67:33 | 11.5 | 54 | 1.8 |

R = C$_6$H$_4$-p-CH$_3$
EASC = Ethylaluminum sesquichloride
DEAC = Diethylaluminum chloride
E:P ratio = relative amounts of ethylene and propylene incorporated into polymer product.
*The number in parenthesis represents the mole ratio of aluminum to vanadium in the catalyst.

The foregoing are intended to merely illustrate certain preferred embodiments of the present invention and, for that reason, should not be construed in a limiting sense. The scope of protection is set forth in the claims which follow.

I claim:

1. A catalyst for the preparation of an ethylene-propylene-diene polymer which comprises a Group I to Group III organometallic compound and a vanadium imido complex.

2. A catalyst as claimed in claim 1 wherein the complex is of the formula X$_3$V=N—R, where X is a group capable of forming a single bond to vanadium via an element from Group VA, VIA or VIIA and R is hydrocarbyl.

3. A catalyst as claimed in claim 2 wherein X is halogen.

4. A catalyst as claimed in claim 2 wherein X is halogen and R is selected from the group consisting of alkyl, aryl, and alkyl-substituted aryl.

5. A catalyst as claimed in claim 1 wherein the complex is of the formula Cl$_3$V=N—R, where R is selected from the group consisting of alkyl, aryl, and alkyl-substituted aryl.

6. A catalyst as claimed in claim 1 wherein the complex is a chloro-containing vanadium imido complex and the organometallic compound contains aluminum.

7. A catalyst as claimed in claim 6 wherein the organometallic compound is a dialkylaluminum halide.

8. A catalyst as claimed in claim 6 wherein the complex contains an alkyl-substituted aryl group.

9. A catalyst as claimed in claim 7 wherein the complex contains an alkyl-substituted aryl group.

10. A catalyst as claimed in claim 1 which contains diethylaluminum chloride and Cl$_3$V=N(C$_6$H$_5$CH$_3$).

* * * * *